Oct. 24, 1944.    J. R. PETTIGROVE    2,360,977
MUD WEIGHING DEVICE
Filed June 22, 1942    2 Sheets-Sheet 1

INVENTOR
JOHN R. PETTIGROVE
BY
ATTORNEYS

Oct. 24, 1944.   J. R. PETTIGROVE   2,360,977
MUD WEIGHING DEVICE
Filed June 22, 1942   2 Sheets-Sheet 2

INVENTOR
JOHN R. PETTIGROVE
BY
ATTORNEYS

Patented Oct. 24, 1944

2,360,977

UNITED STATES PATENT OFFICE 2,360,977

MUD WEIGHING DEVICE

John R. Pettigrove, League City, Tex., assignor to Phillips Petroleum Company, a corporation of Delaware Application June 22, 1942, Serial No. 447,994

4 Claims. (Cl. 73—33)

My invention relates to automatic means for determining and recording the density of drilling mud.

More specifically, my invention is a simplified apparatus which automatically admits a sample of the mud, determines and records the weight per gallon, disposes of the sample and washes the apparatus before admitting a subsequent sample. All of these functions are performed or controlled by the weight of the mud itself. The only source of energy employed, other than gravity, is the spring-driven clock mechanism used in conjunction with the recording chart. Thus my invention is obviously cheaper and simpler of construction and maintenance than are the complicated motor-driven or power controlled arrangements which have heretofore been devised.

The primary object of my invention lies in the provision of a relatively cheap and simple density recorder for drilling mud.

It is a further object to provide a recording densitometer for drilling mud which is automatically self-cleaning.

It is also an object to provide a device of the class described which has a minimum of moving or wearing parts exposed to the drilling mud, thereby insuring reliability and longevity of the instrument.

It is a further object to provide a device which is well adapted to construction from lightweight metal or even from wooden parts, so that emergency repairs may be made in the field if necessary.

In the drawings forming part of this specification,

Figure 1:
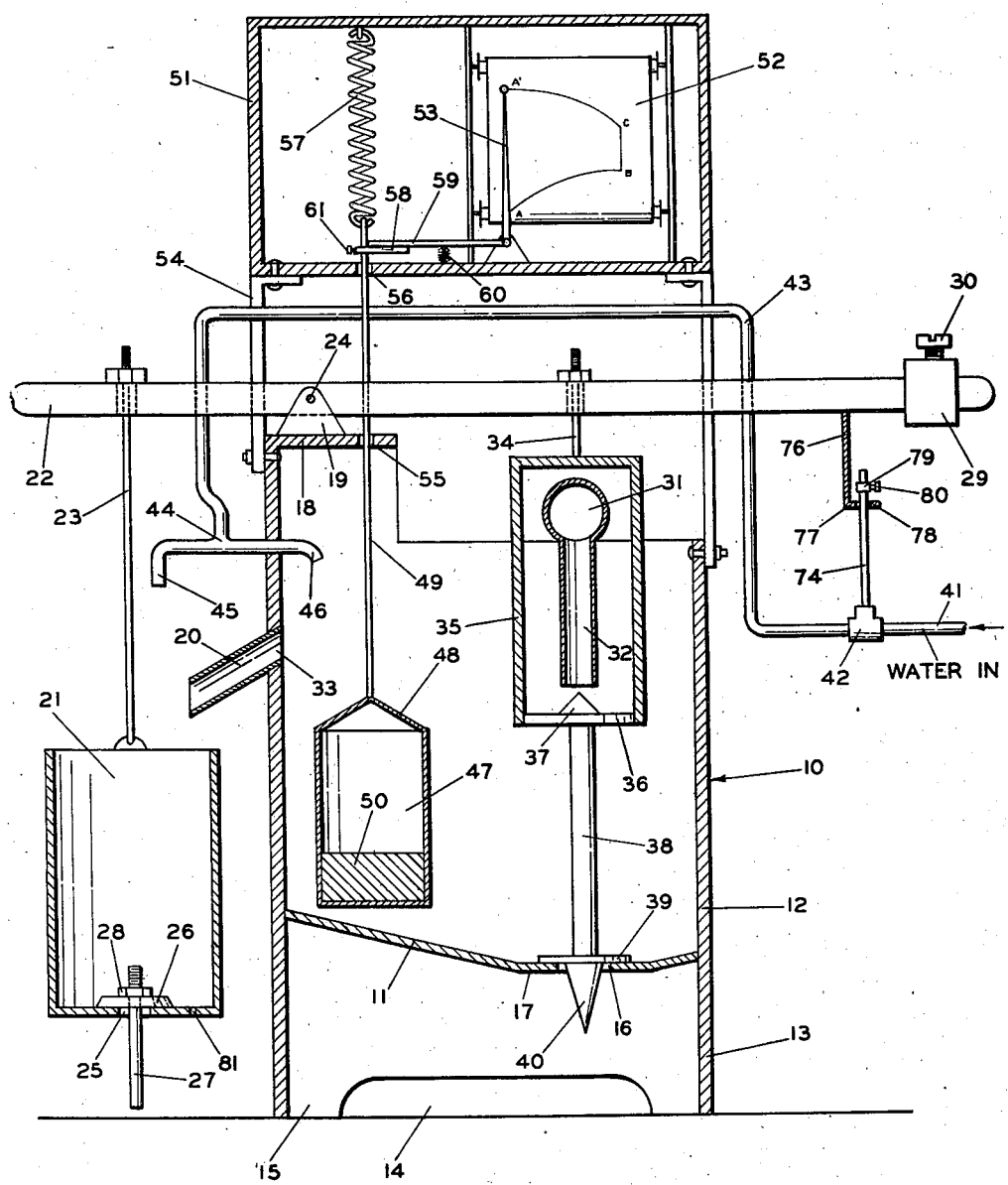
Fig. 1 is an elevational view of my device, partly in section.

Referring now particularly to Fig. 1, the numeral 10 refers generally to a displacement tank. An inserted bottom 11 is located at some distance from the bottom of walls 12, thus forming an open-bottomed base portion 13, which has cutaway portions 14 and leg-like portions 15. The bottom 11 is of asymmetric frustro-conical form, having an opening 16 in the horizontally disposed lowest portion 17. The top of the tank is open except for a small elevated portion 18 at one side, which is provided to carry a bearing support 19. An overflow spout 20 is provided in the tank wall as shown.

Below the open end of spout 20 is suspended a hopper tank 21, the suspension consisting of a pivoted beam 22 and a support rod 23 attached thereto. The beam 22 is pivotally mounted to the bearing support 19 by a pin 24.

The hopper tank 21 is provided with a bottom opening 25 and foot-valve 26, the latter simply a flat disc or plate to the center of which is attached a downwardly extending stem 27. The stem 27 is preferably threaded in valve plate 26, so that adjustment of the protruding stem length may be had. A locknut 28 is provided for retaining the desired adjustment. A slidable counterweight 29 is provided on beam 22, with a set-screw 30 for locking the same at any desired location. An additional small opening 81 is provided in the bottom of tank 21.

Figure 2:
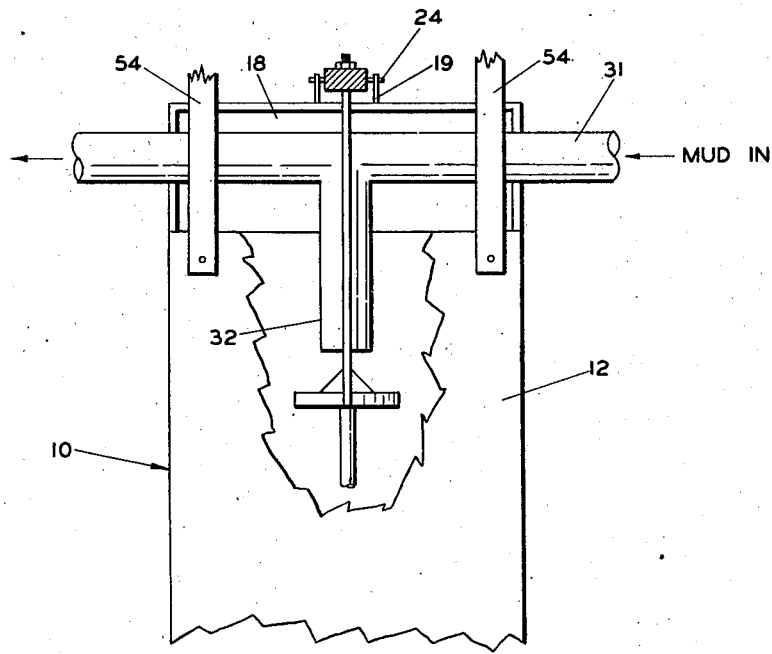
Fig. 2 is a fragmentary side view of part of my invention which is shown in section in Fig. 1.

A conduit 31 is located directly over the opening 16 in tank 10, having a downwardly-extending branch portion 32, the lower (open) end of which is substantially below the level of the mouth 33 of spout 20. By means of a rod 34 and yoke-piece 35 a valve member 36 is suspended below the end of conduit 32. The valve member 36 has a conical portion 37 adapted to seat in the open end of conduit 32 when in contact therewith. Fig. 2 shows a fragmentary side view which is helpful to give a clear understanding of this structure.

Depending from valve 36 is a stem 38, to which is secured a flat disc 39 having a tapered guiding piece 40. The disc 39 has a projected area of appreciable magnitude, for reasons to be explained later. The guide piece 40 is small in cross section as compared with opening 16, its sole function being to assure overlapping or registry of disc 39 over opening 16.

A conduit 41 for clean water passes below any convenient point on beam 22, where a valve 42 is installed. This valve will be described in detail elsewhere in this specification. A continuing conduit 43 leads over or around the tank 10 in any convenient manner, terminating in a branch or distributing portion 44, both ends of which are open. The end 45 is disposed over the open top of hopper tank 21; the right-hand branch passes through the wall of tank 10 as shown and terminates at a point above the flotation member 47.

The flotation member 47 above referred to constitutes the density measuring element of my device. The element consists of a completely enclosed tank whose volume or displacement is accurately known. The top 48 of the tank is of conical form and is attached to a suspending rod 49. During the fabrication of the tank, molten lead or other suitable weighting material is poured into the bottom as at 50. The total weight of the element 47 including weight 50 must exceed the weight of an equal volume of the most dense medium to be measured. Stated another way, the density of the weighted element 47 must exceed the maximum density which is contemplated to be determined. For the purposes herein set forth, I find it convenient to use a volume of exactly one gallon and a total weight of approximately 20 pounds for the element 47.

Enclosed in a suitable case 51 is a clock-driven recorder including a chart 52 and a pen-arm 53. While any conventional recorder may be used, I prefer to use a recorder having a rectilinear or belt-type chart which is wound between a pair of driven spools. Circular rotating charts may be used, but are not as convenient since they require periodic and prompt replacement at the end of each 360° of rotation. The housing 51 is supported above tank 10 by means of suitable supports 54.

The support rod 49 passes through suitable apertures 55 and 56 in the walls of tank 10 and housing 51, respectively. A tension spring 57 is attached securely to the top of housing 51 and its lower end is secured to rod 49. The spring 57 is so designed that it will bear the full unbuoyed weight of member 47 without undue stress, and at the same time will have sufficient resiliency to be sensitive to small increments of load thereon. By means of a collar 58, lever 59 and a light tension hair-spring 60, pen-arm 53 is operatively engaged with rod 49. Rough adjustment of the pen-arm is provided by the collar 58 and its locking screw 61, by manipulation of which the collar may be shifted on rod 49 to bring the pen-arm 53 to an origin or reference line on the chart 52 for calibrating purposes. For finer adjustment, the use of a vernier-type pen-arm such as is provided on conventional recording pressure gauges is recommended. This type of arm is well known in the instrument art and need not be shown or explained in detail here.

Figure 3:
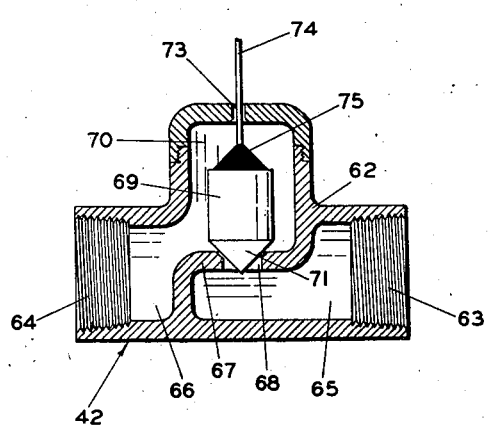
Fig. 3 is an enlarged sectional view of an element shown in Fig. 1.

In Fig. 3 is shown the details of valve 42, previously referred to. This valve has a T-form body 62, provided with an inlet 63 and outlet 64, suitably threaded for attachment to iron pipe or other conduit as may be desired. The interior of the valve is divided into chambers 65 and 66 by the separating wall 67. A valve port 68 is provided in wall 67, the port being chamfered slightly and ground smooth on its upper side. A solid metal valve member 69 is provided in chamber 70, having a tapered portion 71 adapted to seat on the ground upper edge of port 68. The closure of chamber 70 is completed on the upper side by a threaded cap having an aperture 73, the latter being chamfered smoothly on the inner or lower side. A stem 74 attached to valve member 69 passes through aperture 73, in which it is fitted very loosely. A tapered rubber collar 75 fits snugly over stem 74, forming a resilient seat for sealing off the opening 73 when the valve 69 is raised to the uppermost limit.

Referring again now to Fig. 1, it is seen that a wire or small rod 76 operatively connects beam 22 of my device to the stem 74 of valve 42. The rod 76 is looped at its lower end, the rod being bent at right angles at a point 77 so as to place the looped portion 78 in a horizontal plane. The stem 74 passes through the loop, and at a point above the same is provided a collar 79 with a set-screw 80. Thus upward travel of rod 76 will, upon contact of loop 78 with collar 79, cause valve 42 to be opened. The sliding engagement of rod 76 with stem 74 is such that motion of rod 76 (and therefore of weight 29) in a downward direction can continue after the valve 42 has reached the closed condition. It is seen then that valve 42 is closed only by weight of the valve member 69 and rod 74.

In operation, the conduit 31 is placed in communication with a part of the system through which the drilling mud is constantly circulated. At the beginning of a cycle of operation of my device, tanks 10 and 21 are empty; valves 26, 39 and 42 are closed; valve 37 is open, and a part of the mud travelling through line 31 begins to enter tank 10 via the conduit branch 32. Tank 10 eventually fills to the level determined by the opening 33 of overflow spout 20, flotation member 47 (which is of greater density than the mud) consequently becomes completely submerged in the fluid mud. As the mud rises around member 47, the member begins to be buoyed up by the displaced mud, with the result that the downward load on spring 57 gradually decreases and member 47 consequently rises. The rise of member 47 during filling of tank 10 causes the recording pen to trace the curve A—B on the chart.

When the mud reaches the level of opening 33, mud begins to flow through spout 20 into tank 21. Note that, before tank 21 begins to fill the principal loads to the right of the pivot on beam 22 are two in number, namely: (1) the counter-weight 29, and (2) the static head of fluid in tank 10 acting on the exposed top surface of valve disc 39. When the filling of tank 21 proceeds to the point where the filled weight is sufficient to overcome the combined effect of the two loads above noted, the force system becomes overbalanced so as to begin opening of the bottom outlet 16 in tank 10. As soon as this opening begins, the effect of the static head of mud above disc 39 becomes equalized, and the weight 29 now becomes the only factor in opposition to the weight of tank 21 and its contents. This sudden reduction of clockwise movement producing force results in sudden dropping of tank 21. The results are: (1) closure of duct 32 by seat 37; (2) full opening of bottom valve 39—16 in tank 10; (3) opening of valve 26 in tank 21 upon contact of stem 27 with the drilling derrick floor or other supporting surface, and (4) opening of water valve 42.

The sizes of openings 16 and 25 are so proportioned that tank 10 drains completely in the time required to drain from tank 21 a weight of mud equal to the initial weight imposed on disc 39 by the static head of mud in tank 10. Thus, by proper selection of sizes of openings 16 and 25, time may be provided for complete draining of mud from tank 10 and for thorough flushing of member 47 with clean water from inlet 46 before beam 22 again reaches a balanced condition. Water meanwhile is introduced to tank 21 from outlet 45, diluting the mud and promoting its complete removal.

When beam 22 again slightly overbalances in the clockwise direction, valves 26, 39 and 42 begin to re-close and valve 36 begins to open. After valve 26 becomes completely closed, diluted mud or clear water, whichever remains in tank 21, continues to drain through opening 81, permitting further unbalancing of beam 22 and insuring full closure of the various valves. Draining of tank 21 is completed through opening 81 during re-filling of tank 10 in the subsequent cycle of operation.

As was noted before, the curve A—B will be traced on chart 52 during the submersion by incoming mud of element 47. As soon as element 47 becomes completely submerged buoyant equilibrium in accordance with Archimedes' principle is reached and no further substantial movement of the recording pen will occur until the tank 10 has drained sufficiently to begin uncovering of element 47. Hence, in the interim, the recording pen will trace the substantially straight curve segment B—C. When element 47 begins its descent upon further draining of tank 10, the curve segment C—A' is started, terminating at A' when the tank 10 is drained below the lowest portion of element 47. The segment B—C of the curve is a record of the density of the mud which, by proper calibration of the chart, may be read directly as pounds per gallon (the customary units for this work) or in any other terms that may be desired.

It will be noted that provision is made for adjustment of the time of opening of all the valves employed in my device, so that the proper sequence and interval of operation may be secured. It is of course obvious that many modifications may be made in the construction of the various valves. In this connection, I will point out the principal considerations with regard to the type and design of the valves which I have found suitable.

The water valve 42 as illustrated is a desirable type for the reason that little energy is required to open it, and it is self-closing. Since the weight of the valve member itself is relied upon to close the port, the weight of the valve member must exceed the product of the water pressure times the port area. In order to hold the valve member weight within reasonable limits so that an undue amount of lift will not be required to open it, I prefer to feed the water system from an elevated tank by gravity. A pressure system may be employed, however, if circumstances dictate such use, by proper design of the valve, or by use of a valve of different type.

With regard to the tank drain valve 39, the important consideration here is that the valve disc have enough area so that the static head acting upon its upper side will produce a force of substantial magnitude as compared to the total unbalancing forces to the right of pivot 24. This is necessary to provide positive operation of the draining cycle as previously described. The various parts must be arranged to avoid any possibility of the beam 22 coming to a sustained condition of balance, in which case the system would come to rest in a non-operating intermediate position.

Having described a preferred form of my invention and having pointed out the principal considerations to be observed in the construction of equivalent systems, it is understood that the invention is to be limited only in accordance with the scope of the appended claims. While my invention is particularly useful for determining and recording the density of well-drilling mud, it also could be used to advantage in any application where a continuous measurement of density of fluid or semifluid materials is desired.

I claim:

1. In a device for obtaining a continuous record of drilling-mud density, the combination comprised of a tank wherein a sample of mud is accumulated, displacement means within said tank for measuring the density of the sample, means associated with said displacement means for recording said density, a weight-loaded beam associated with said tank, a second tank suspended from said beam and positioned to catch an overflow of fluid from the first said tank, and valve means operatively connected to said beam to control the admission of mud to the first said tank.

2. In a weighing device for fluid material substantially as described, the apparatus comprising a tank wherein the density of a fluid sample is to be determined, valve means controlling admission and removal of said fluid sample, weight-actuated means operable by overflowed fluid from said tank to control said valve means, a clean water supply line including a shutoff valve, said shutoff valve being operable by said weight-actuated means to admit clean water to said tank before admission of a succeeding fluid sample.

3. A mud weighing device comprising in combination a test tank, a hydrometer with displacement means in the test tank, means for periodically filling with drilling mud and emptying said test tank comprising filling, emptying and overflow conduits in the test tank, valve means in said filling and emptying conduits, lever means to operate said valves, and a container filled from said overflow to operate said lever, whereby said hydrometer will indicate the specific gravity of the mud when the test tank is full, and cleaning means comprising a liquid stream controlled by the motion of said lever and operating while the test tank is emptying for cleaning any mud deposit from the tank, the container and displacement means.

4. A mud weighing device comprising in combination a test tank, a hydrometer with displacement means in the test tank, means for periodically filling with drilling mud and emptying said test tank comprising filling, emptying and overflow conduits in the test tank, valve means in said filling and emptying conduits, lever means to operate said valves, and a container filled from said overflow to operate said lever, said container having a dump valve, whereby said hydrometer will indicate the specific gravity of the mud when the test tank is full, and cleaning means comprising a liquid stream controlled by the motion of said lever and operating while the test tank is emptying for cleaning any mud deposit from the tank, the container, dump valve and displacement means.

JOHN R. PETTIGROVE.